Aug. 24, 1937.  C. GIRL  2,091,070
DECK LOADER AND UNLOADER
Filed April 10, 1936  2 Sheets-Sheet 1

INVENTOR
CHRISTIAN GIRL
BY Whittemore Hulbert
Whittemore Belknap
ATTORNEYS

Aug. 24, 1937.
C. GIRL
2,091,070
DECK LOADER AND UNLOADER
Filed April 10, 1936
2 Sheets-Sheet 2
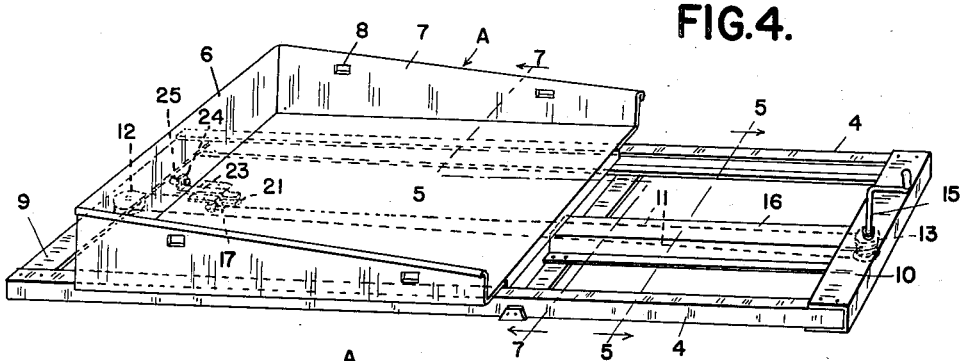
FIG.4.
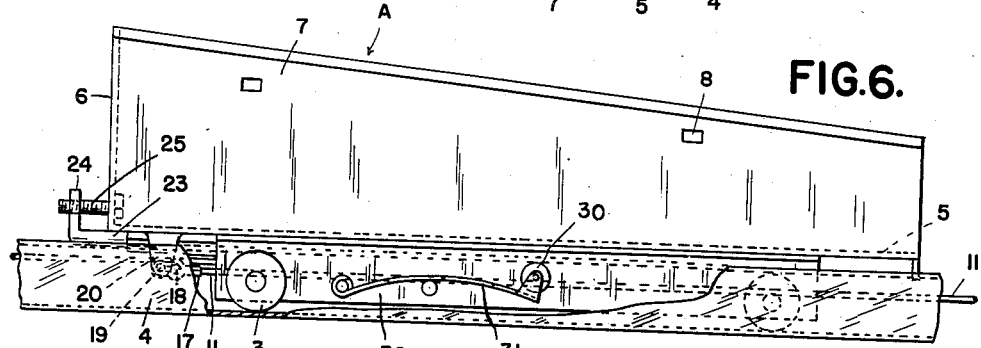
FIG.6.
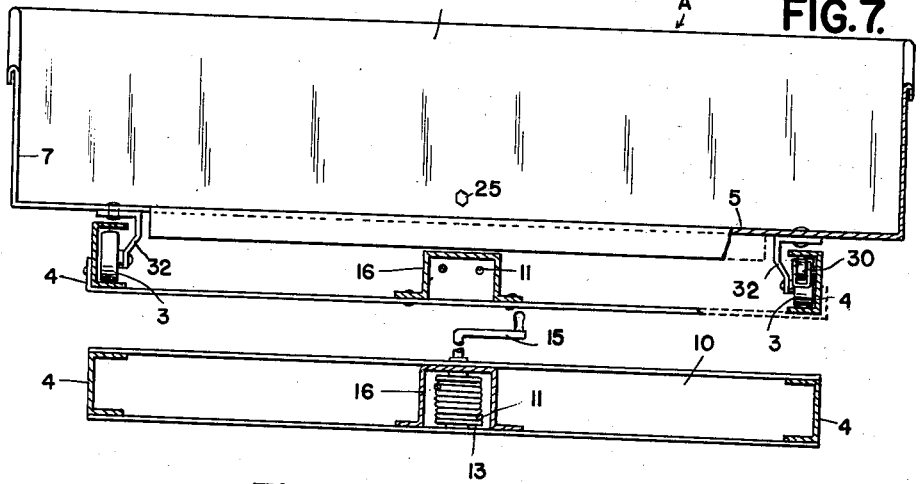
FIG.7.
FIG.5.
INVENTOR
CHRISTIAN GIRL
BY
ATTORNEYS Patented Aug. 24, 1937

2,091,070

UNITED STATES PATENT OFFICE 2,091,070

DECK LOADER AND UNLOADER

Christian Girl, Detroit, Mich., assignor to Kelch Heater Company, Detroit, Mich., a corporation of Michigan Application April 10, 1936, Serial No. 73,741

12 Claims. (Cl. 214—65)

This invention relates generally to loading and unloading devices for the rear decks or storage compartments of coupes and constitutes an improvement upon the devices for this purpose set forth in my Patent No. 2,014,019 dated September 10, 1935.

One of the essential objects of the invention is to simplify the construction and reduce the over-all cost of manufacturing and installing such devices. In the present instance, this is accomplished by using only one cable and by providing such cable with improved connections with the article carrier.

In the accompanying drawings:

Figure 4 is a perspective view of the loading and unloading device;

Figure 5 is a sectional view taken substantially on the line 5—5 of Figure 4;

Figure 6 is a fragmentary side elevation of the structure shown in Figure 4 with parts broken away and in section;

Figure 7 is a cross sectional view taken substantially on the line 7—7 of Figure 4.

Figure 1:
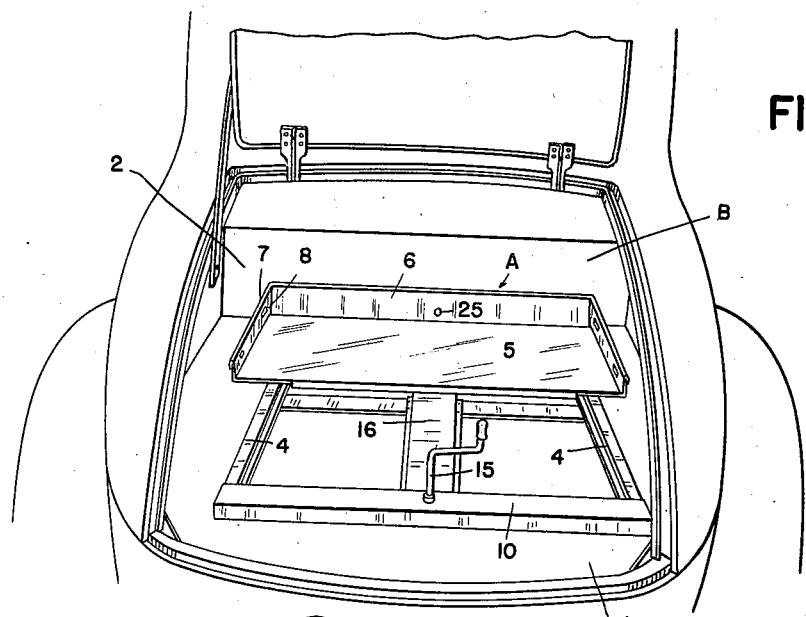
Figure 1 is a fragmentary perspective view of a coupe showing a loading and unloading device embodying my invention within the rear storage compartment thereof and with the article carrying tray of the device at the inaccessible forward end of the storage compartment.
Figure 2:
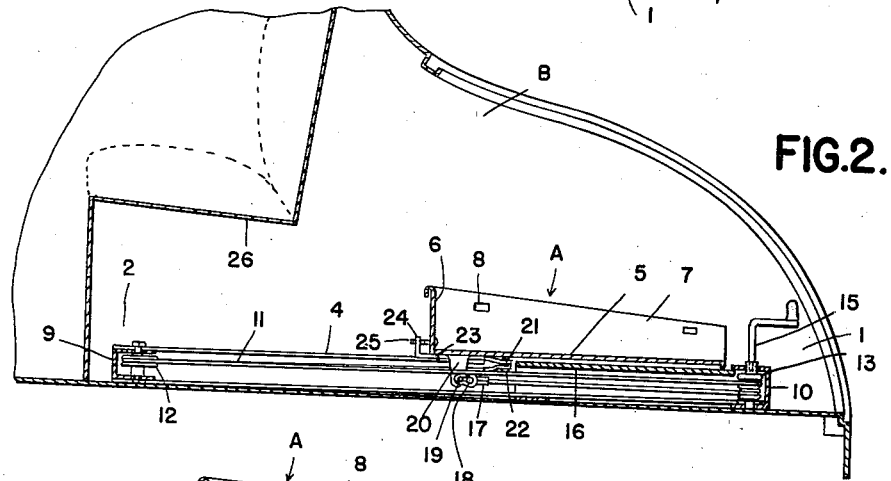
Figure 2 is a fragmentary longitudinal vertical sectional view through the coupe and showing the article carrier at the accessible rear end of the storage compartment.
Figure 3:
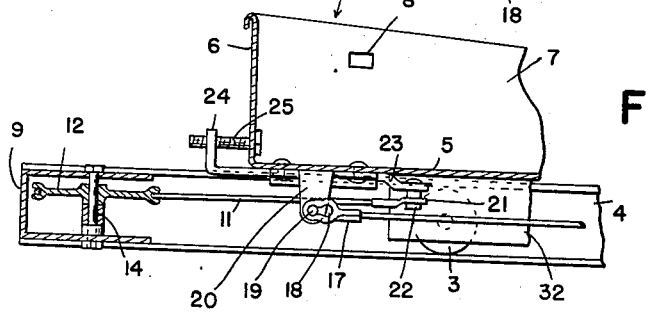
Figure 3 is an enlarged fragmentary vertical sectional view through the device and showing more particularly the connections between the cable and the article carrier.

Referring now to the drawings, A is an article carrier within the rear deck or storage compartment B of a coupe. As shown, this carrier is movable lengthwise of the compartment from an accessible rear end 1 to a relatively inaccessible forward end 2 thereof and for this purpose is provided at its forward and rear ends with casters or rollers 3 that travel in inwardly opening longitudinally extending channels 4 rigidly mounted within the compartment.

Preferably the carrier A is in the form of a tray having a substantially flat bottom 5 and upright front and side walls 6 and 7, respectively. Any suitable means such as straps (not shown) may be engaged with openings 8 in the side walls 7 of the tray to hold articles in or on the carrier A. Likewise, any suitable material such as sheet metal may be used in the construction of such carrier.

Preferably the channels 4 are connected at their forward and rear ends to cross bars 9 and 10, respectively, which are also of channel configuration. As shown in Figure 4, such cross bars 9 and 10 cooperate with the channels 4 to form a substantially rectangular frame.

In the present instance, the carrier A is moved forwardly and rearwardly in the compartment B by a single cable 11 which, as shown, is trained around a sheave 12 and a drum 13 carried respectively by the forward and rear cross bars 9 and 10 of the frame. Preferably the sheave 12 is within the rearwardly opening channel of the cross bar 9 and is mounted to turn on an upright shaft 14 anchored in the top and bottom flanges of said cross bar, while the drum 13 is mounted to turn within the forwardly opening channel of the rear cross bar 10 and is provided with a removable crank 15. Any suitable means such as the flanged inverted channel 16 may be employed as a guard over the cable 11 between the rear cross bar 10 and the carrier A when the latter is in its forward position, as illustrated in Figure 4.

Referring now to the connections between the cable 11 and the carrier A, 17 is a tab rigid with one end of the cable and having a substantially keyhole slot 18 therein receiving a headed stud 19 on a bracket 20 rigid with the bottom 5 of the carrier at its forward end, 21 is another tab rigid with the other end of the cable and connected to a headed stud 22 depending from the rear end of an adjustable slide 23 carried by the bracket 20. As shown, the forward end 24 of the slide is turned up and is threadedly engaged by an adjusting screw 25 carried by the front wall 6 of the carrier.

In use, the carrier A may be moved forwardly and rearwardly in the storage compartment B by the cable 11. The crank 15 may be readily engaged with the drum 13 for this purpose and may be readily removed while the carrier A is being loaded or unloaded. Such crank 15 may be stored at any convenient point on the coupe while the latter is in transit. Should for any reason the cable 11 need to be tightened or loosened, the desired adjustment thereof may be readily effected by adjustment of the screw 25.

Thus, from the foregoing, it will be apparent that I have provided a very efficient and practical carrier which may be easily and conveniently loaded or unloaded without climbing upon a rear bumper or other part of the vehicle. In other words, the carrier may be readily manipulated and loaded and unloaded by one person from either side of the coupe while such person is standing on the ground. After the carrier has been loaded in its rearward position, it may be moved forwardly under the seat 26 of the coupe so that the space in the compartment at the rear of the carrier may be loaded. When unloading, the articles are removed first from the space within the compartment at the rear of the carrier and then the carrier is moved rearwardly and unloaded.

If desired, a roller 30 urged by a leaf spring 31 carried by the roller supporting bracket 32 may be provided for engagement with the top flange of each channel 4 to maintain proper engagement of the rollers 3 with the lower flanges of said channels.

What I claim as my invention is:

1. A loading and unloading device for a rear compartment of a coupe, said compartment having an accessible rear end and a relatively inaccessible forward end, comprising an article carrier movable lengthwise of the compartment from substantially one end to the other thereof and provided with supporting rollers, a substantially rectangular frame rigidly mounted within said compartment and substantially parallel with the floor thereof, opposite sides of said frame forming runways for said rollers, and means for moving said article carrier lengthwise of said compartment including rotatable elements at opposite ends of the frame, a bracket rigid with the article carrier, an adjustable slide carried by said bracket, and a single flexible cable trained around said rotatable elements and having opposite ends thereof rigidly connected to said bracket and adjustable slide respectively.

2. A loading and unloading device for a rear compartment of a coupe, said compartment having an accessible rear end and a relatively inaccessible forward end, comprising an article carrier movable lengthwise of the compartment from substantially one end to the other thereof and provided with supporting rollers, a substantially rectangular frame rigidly mounted within said compartment and substantially parallel with the floor thereof, opposite sides of said frame forming runways for said rollers, and means for moving said article carrier lengthwise of said compartment including rotatable elements at opposite ends of said frame, a bracket connected to the article carrier, an adjustable slide carried by said bracket, means carried by the article carrier for adjusting said slide, and a single flexible cable trained around said rotatable elements and terminally connected to said bracket and adjustable slide respectively.

3. A loading and unloading device for a rear compartment of a coupe, said compartment having an accessible rear end and a relatively inaccessible forward end, comprising an article carrier movable lengthwise of the compartment from substantially one end to the other thereof and provided with supporting rollers, runways for said rollers rigidly mounted within said compartment and substantially parallel with the floor thereof, and means for moving said article carrier lengthwise of said compartment including rotatable elements at opposite ends of the runways, a bracket connected to the article carrier, an adjustable slide carried by said bracket, means carried by the article carrier for adjusting said slide, and a single flexible means trained around said rotatable elements and connected to said bracket and adjustable slide respectively.

4. A loading and unloading device for a rear compartment of a coupe type vehicle, said compartment having a relatively inaccessible forward end, comprising an article carrier movable lengthwise of said compartment from substantially one end to the other thereof and provided with supporting rollers, a substantially rectangular frame mounted within said compartment and substantially parallel with the floor thereof, opposite sides of said frame providing runways for said rollers, a sheave intermediate said runways at one end of said frame, a drum intermediate said runways at the other end of said frame, a bracket rigid with said article carrier, an adjusting slide carried by said bracket, and means for moving said article carrier lengthwise of said runways including a crank for said drum, and a single flexible cable trained around said drum and sheave, one end of said cable being rigidly connected to said bracket, and the other end of said cable being rigidly connected to said adjustable slide.

5. A loading and unloading device comprising an article carrier provided with supporting rollers, a substantially rectangular supporting frame, opposite sides of said frame forming runways for said rollers, and means for moving said article carrier lengthwise of said runways including rotatable elements at opposite ends of said frame, a bracket connected to the article carrier, an adjustable slide carried by said bracket, means carried by the article carrier for adjusting said slide, and a single flexible cable trained around said rotatable elements and terminally connected to said bracket and adjustable slide respectively.

6. A loading and unloading device comprising an article carrier provided with supporting rollers, runways for said rollers, and means for moving said article carrier lengthwise of said runways including rotatable elements at opposite ends of the runways, a bracket connected to the article carrier, an adjustable slide carried by said bracket, means carried by the article carrier for adjusting said slide, and a single flexible means trained around said rotatable elements and connected to said bracket and adjustable slide respectively.

7. In a loading and unloading device of the class described, an article carrier, runways for said article carrier, elongated brackets rigid with said article carrier, supporting rollers for said article carrier carried by said brackets at longitudinally spaced points thereof and engaging said runways, and means for maintaining proper engagement between said rollers and runways to avoid rattling, including spring pressed rollers carried by said brackets between said longitudinally spaced rollers and engaging said runways.

8. In a loading and unloading device of the class described, an article carrier, runways for said article carrier having top and bottom walls, rollers connected to said article carrier at longitudinally spaced points thereof and engaging the bottom walls of said runways, and means for maintaining proper engagement between the rollers and runways to avoid rattling, including spring pressed rollers connected to said article carrier between said longitudinally spaced rollers and engaging the top walls of said runways.

9. In a loading and unloading device of the class described, an article carrier, runways for said article carrier, supporting rollers for said article carrier engaging said runways, cross bars fastened to said runways at spaced points longitudinally thereof, two of said cross bars being at opposite ends of said runways, one at each end, an intermediate cross bar being at a point that is substantially in vertical alignment with the rear end of said article carrier when the latter is at the forward end of said runways, a cable carried by the cross bars at opposite ends of said runways and extending between the latter for moving the article carrier lengthwise of the runways from one end thereof to the other, and means for guarding the portion of the cable disposed between the rear cross bar and article carrier when the latter is at the forward end of said runways, comprising an inverted channel-shaped shield covering the top and sides of the portion aforesaid of said cable and fastened to said rear and intermediate cross bars.

10. In a loading and unloading device of the class described, an article carrier, runways for said article carrier, supporting rollers for said article carrier engaging said runways, cross bars fastened to said runways at spaced points longitudinally thereof, two of said cross bars being at opposite ends of said runways, one at each end, an intermediate cross bar being at a point that is substantially in vertical alignment with the rear end of said article carrier when the latter is at the forward end of said runways, a cable carried by the cross bars at opposite ends of said runways and extending between the latter for moving the article carrier lengthwise of the runways from one end thereof to the other, and means for guarding the portion of the cable disposed between the rear cross bar and article carrier when the latter is at the forward end of said runways, comprising an elongated member covering the portion aforesaid of said cable and fastened to said rear and intermediate cross bars.

11. A loading and unloading device comprising an article carrier provided with supporting rollers, runways for said rollers, and means for moving said article carrier lengthwise of said runways including rotatable elements adjacent opposite ends of said runways, a bracket rigid with the article carrier, an adjustable slide carried by said bracket, and a single flexible cable trained around said rotatable elements and terminally connected to said bracket and adjustable slide respectively.

12. In a loading and unloading device of the class described, an article carrier, runways for said article carrier, supporting rollers connected to said article carrier at longitudinally spaced points thereof and engaging said runways, and means for maintaining proper engagement between said rollers and runways to avoid rattling, including spring pressed rollers carried by said article carrier between said longitudinally spaced rollers and engaging said runways.

CHRISTIAN GIRL.